(12) United States Patent
Singh et al.

(10) Patent No.: US 10,237,877 B1
(45) Date of Patent: Mar. 19, 2019

(54) SYSTEMS AND METHODS FOR SCHEDULING HIGH POWER WIRELESS DEVICES FOR RESOURCE ALLOCATION

(71) Applicant: Sprint Spectrum LP, Overland Park, KS (US)

(72) Inventors: Jasinder P. Singh, Olathe, KS (US); Siddharth S. Oroskar, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 15/388,027

(22) Filed: Dec. 22, 2016

(51) Int. Cl.
| | |
|---|---|
| *H04W 72/04* | (2009.01) |
| *H04W 72/12* | (2009.01) |
| *H04W 52/26* | (2009.01) |
| *H04W 52/24* | (2009.01) |
| *H04L 12/26* | (2006.01) |

(52) U.S. Cl.
CPC ..... *H04W 72/0486* (2013.01); *H04W 72/048* (2013.01); *H04W 72/1252* (2013.01)

(58) Field of Classification Search
CPC ......... H04W 72/0486; H04W 72/1252; H04W 72/048
See application file for complete search history.

(56) References Cited

U.S. PATENT DOCUMENTS

| | | | |
|---|---|---|---|
| 9,078,220 B2 | 7/2015 | Makhlouf et al. | |
| 2014/0031052 A1* | 1/2014 | Lagerqvist | H04W 72/1268 455/452.1 |
| 2015/0031410 A1* | 1/2015 | Lim | H04W 52/146 455/522 |
| 2015/0092670 A1* | 4/2015 | Makhlouf | H04W 52/265 370/329 |
| 2015/0103652 A1* | 4/2015 | Lee | H04L 43/028 370/230 |
| 2016/0029239 A1* | 1/2016 | Sadeghi | H04W 52/244 370/252 |

* cited by examiner

*Primary Examiner* — Kiet Tang

(57) ABSTRACT

Systems and methods are described for allocating resources from an access node in a wireless network. Power reports may be received from multiple wireless devices at the access node. Based on the received power reports, the access node may classify each wireless device of the multiple wireless devices as a high power wireless device or a low power wireless device. An offset scheduling factor may be selected for wireless devices classified as high power wireless devices at the access node. Resources can be allocated for high power wireless devices using the selected offset scheduling factor.

15 Claims, 7 Drawing Sheets

SYSTEMS AND METHODS FOR SCHEDULING HIGH POWER WIRELESS DEVICES FOR RESOURCE ALLOCATION

TECHNICAL BACKGROUND

As wireless networks evolve and grow, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. When portion(s) of the wireless network experience high load (e.g., loading above a threshold), which may stem from large amounts of data traffic and/or poor channel conditions, access node(s) may collect power headroom and other data from the wireless devices; access nodes use the collected data to schedule (or assign) uplink (UL) and/or downlink (DL) wireless resources (i.e., wireless resource grant) for connected wireless devices. Due to disparities in power headroom data reported at the access node(s) by wireless devices, scheduler(s) of the access node(s) often choose high power wireless devices for UL wireless resource grant(s) compared to (or over) off-the-shelf wireless devices and/or other deployed low power wireless devices with similar power state(s) and/or radio frequency (RF) condition(s). Accordingly, a channel-aware system that schedules UL wireless resources, while balancing network load, such that high power wireless devices are not unduly chosen for resource grant(s) over off-the-shelf or other deployed wireless devices is desirable.

OVERVIEW

Systems and methods are described for allocating resources from an access node in a wireless network. In one instance, multiple wireless devices operating in a radio range of an access node are instructed to send power headroom reports to the access node. On receipt of the power headroom reports, the access node classifies each of the multiple wireless devices as a high power wireless device or a low power wireless device (i.e., based on power headroom data sent in the power headroom reports). For wireless devices classified as high power wireless devices, an offset scheduling factor may be selected. Wireless resources are allocated or assigned (i.e., wireless resource grant) to the high power wireless devices using the selected offset scheduling factor.

Systems and methods are also described for scheduling transmissions and/or wireless resources from an access node. In one embodiment, power reports associated with a plurality of wireless devices are collected at the access node; the collected power reports are compared to a criteria. The access node selects a scheduling factor to be applied to a maximum transmit power of a first group of wireless devices of the plurality of wireless devices whose collected power report(s) meet the criteria. Alternatively, maximum transmit power(s) of a first wireless device and a second wireless device are monitored at the access node. The access node calculates a power offset for the first wireless device when the maximum transmit power of the first wireless device meets a criteria. Based on the calculated power offset, the access node via a scheduler selects a scheduling factor to be applied to the first wireless device. Wireless resources are scheduled for the first wireless device and the second wireless device based on the selected scheduling factor.

In yet another embodiment, systems and methods are described for scheduling transmissions from an access node. A scheduling offset factor can be calculated for a first wireless device at the access node when: (i) a power headroom reported at the access node by the first wireless device is greater than a power headroom reported by a second wireless device; and, (ii) a buffer size of the first wireless device and a buffer size of the second wireless device are both are within a predefined range of buffer sizes. Wireless resources are scheduled for the first wireless device using the calculated scheduling offset factor.

DETAILED DESCRIPTION

In an effort to boost coverage and enhance throughput in wireless networks, network operators have proposed deployment of high power wireless devices (e.g., power class 1 or 2 wireless devices, illustrated in Table 1 below) throughout the wireless network alongside off-the-shelf and/or other currently deployed low power wireless devices (e.g., power class 3 or 4 wireless devices, illustrated in Table 1 below). Wireless networks use data scheduler(s) and/or scheduler node(s) to schedule (or assign) uplink (UL) and/or downlink (DL) wireless resources (i.e., wireless resource grant) among connected wireless devices without regard to (or irrespective of) the power class of the wireless device. Typically, the power class of the wireless device does not unduly influence wireless resource grants to the connected wireless devices. But, when high power wireless devices and off-the-shelf and/or other deployed low power wireless devices, operating within a radio range (i.e., minimum usable signal area) of an access node, report similar maximum allowable transmit power(s) and/or capacity/delay characteristics at the access node, scheduler(s) of the access node may unduly choose the high power wireless devices for UL resource grant(s) compared to (or over) off-the-shelf and/or other deployed low power wireless device because of disparities in power headroom data reported at the access node by the wireless devices. In one embodiment, to address power headroom disparities between high power wireless devices and off-the-self and/or other deployed low power wireless devices, the access node may calculate an offset for wireless devices whose reported power headroom data meets a criteria. Using the calculated offset, the access node and/or scheduler(s) can select a weighting (or scheduling factor) for the wireless device. The scheduler(s) may use the selected weightings to distribute wireless resources among the connected wireless devices.

Figure 1A:
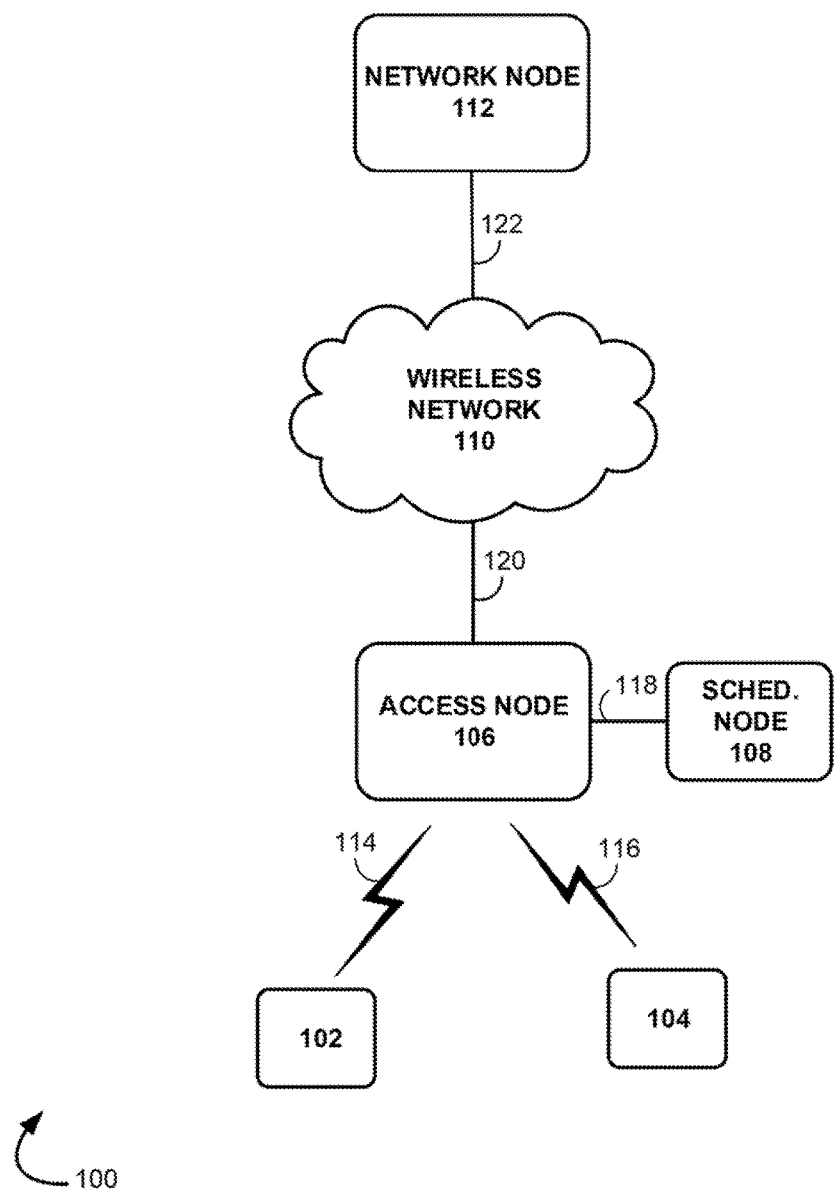
FIG. 1A illustrates an exemplary communication system for scheduling transmissions from an access node in a wireless network.
Figure 1B:
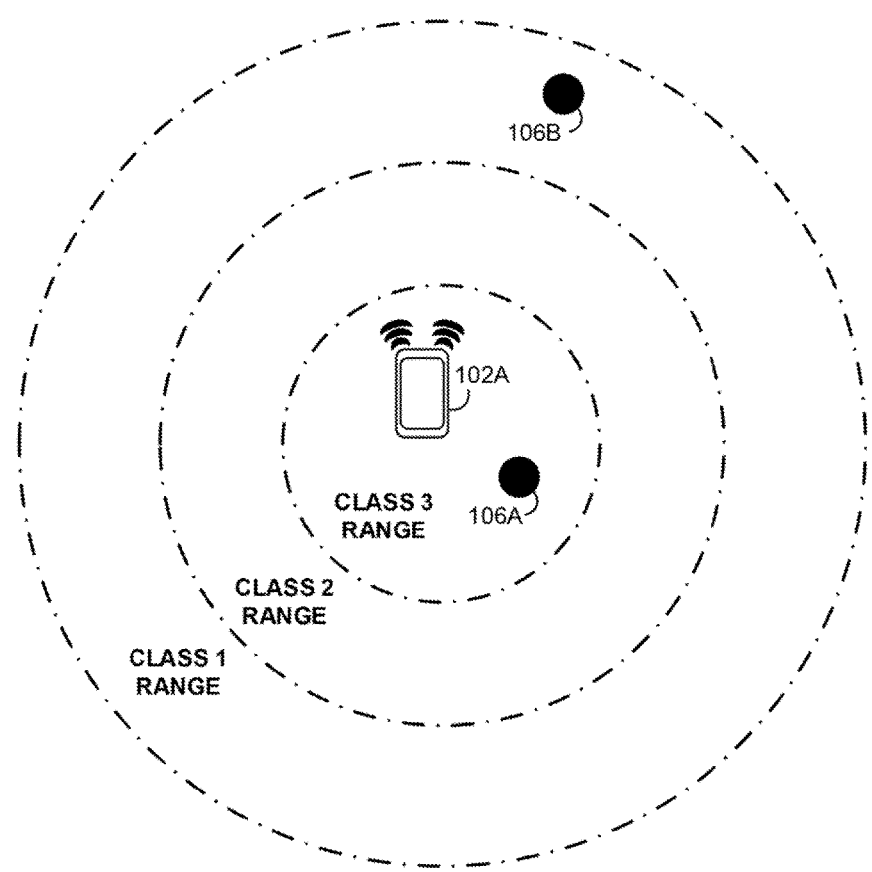
FIG. 1B illustrates exemplary power class range(s) of high power wireless devices and off-the-shelf and/or other currently deployed wireless devices of the exemplary communication system illustrated in FIG. 1A.

FIG. 1A illustrates an exemplary communication system 100 for scheduling (or assigning) UL/DL transmissions to/from an access node in a communication network. FIG. 1B illustrates exemplary power class range(s) of high power wireless devices and off-the-shelf and/or other deployed low power wireless devices of the exemplary communication system 100 illustrated in FIG. 1A. System 100 can comprise high power wireless devices and/or off-the-shelf or other low power wireless devices 102, 102A, 104, access nodes 106, 106A, 106B, scheduler node 108, network node 112, and wireless network 110. Access nodes 106, 106A, 106B can further include a data scheduler (not shown). The communications between high power wireless devices and/or low power wireless devices 102, 102A, 104 and access nodes 106, 106A, 106B can be relayed, monitored, inspected, and/or scheduled by an inspection module or node at access nodes 106, 106A, 106B and/or scheduler node 108.

Generation Partnership Project Long Term Evolution (3GPP LTE) network architecture and/or protocol. For example, off-the-shelf and/or other low power wireless devices or User Equipments (LPUEs) are currently defined in LTE as power class 3 and/or power class 4 wireless devices. Power class 3 and/or power class 4 LPUEs can be configured (in LTE) with a maximum allowable transmit power level of +23 dBm for network operating Bands I-III with a nominal power tolerance of ±2 dB (e.g., for E-UTRA bands). High power class wireless devices or UEs (HPUEs) are currently defined in LTE as power class 1 or power class 2 wireless devices. Power class 1 and/or power class 2 HPUEs can be configured (in LTE) with a maximum allowable transmit power level of +26 dBm for network operating Bands I-II with a nominal power tolerance ±2 dB (e.g., for E-UTRA bands), as illustrated in Table 1. But, one of ordinary skill in the art would recognize that high power wireless devices and/or low power wireless devices are not limited to any specific technology architecture, such as LTE, and can be used with any network architecture and/or protocol.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between high power wireless devices 102, 102A and/or low power wireless devices 104, access nodes 106, 106A, 106B, scheduler node 108, wireless network 110, and network node 112, which are omitted for clarity, including additional processing nodes, routers, gateways, and physical and/or wireless data links for carrying data among the various network elements.

As noted above, wireless devices 102, 102A, 104 can be configured as different power class wireless devices (e.g., high power wireless devices and/or low power wireless devices) and can be any device configured to communicate over system 100 using a wireless communication link or interface. In one embodiment, illustrated in Table 1 below, the maximum allowable transmit power for wireless devices 102, 102A, 104 can be defined by the power class of the wireless device. For example, the maximum allowable transmit power level and tolerance (i.e., power error limits) with which wireless device 102, 102A, 104 can transmit data on a given operating band (e.g., Bands I-III) can be specified based on a pre-defined power class (e.g., power classes 1-4 illustrated in Table 1 below and/or FIG. 1B) of the wireless device 102, 102A, 104 rather than a physical maximum transmit capability of the wireless device 102, 102A, 104 hardware.

In one embodiment, high power wireless devices and/or low power wireless devices can be implemented using Third Wireless devices 102, 102A, 104 (e.g., configured as either high power wireless devices or low power wireless devices) can include a cell phone, a smart phone, a computing platform such as a laptop, a palmtop, or a tablet, a personal digital assistant (PDA), an internet access device, and combinations thereof. Wireless devices 102, 102A, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Access nodes 106, 106A, 106B can include a data scheduler(s) and can be any network node configured to provide communication between wireless devices 102, 102A, 104 and wireless network 110. Access nodes 106, 106A, 106B can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 106, 106A, 106B can use data scheduler(s) and/or coordinate with scheduler node 108 to communicate scheduling decisions (e.g., UL/DL scheduling assignments) to wireless devices 102, 102A, 104 using control information carried by an UL/DL control channel.

Scheduler node 108 (or data schedulers) can be any network node configured communicate scheduling decisions (e.g., UL/DL scheduling assignments, etc.) between wireless devices 102, 102A, 104 and access nodes 106, 106A, 106B using control information carried by an UL/DL control channel. In one embodiment, scheduler node 108 (or data schedulers) can collect and store a maximum allowable transmit power (e.g., associated with a defined power class of wireless device 102, 102A, 104) and/or data related to capacity/delay characteristics (e.g., an amount of data buffered per wireless device, a radio frequency (RF) signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.) of the wireless devices 102, 102A, 104 reported (or calculated) at access node 106, 106A, 106B. The scheduler node 108 (or data schedulers) can use preset or dynamic scheduling algorithms to prioritize (or schedule) wireless devices 102, 102A, 104 for UL/DL wireless resource (i.e., wireless resource grant) compared to (or over) other wireless devices 102, 102A. 104 with/without regard to the power class of the wireless device 102, 102A, 104. The scheduling algorithm can include, for example, a proportional fairness scheduling algorithm (e.g., low proportional fairness, medium proportional fairness, and high proportional fairness), a data rate scheduling algorithm, and/or a hybrid scheduling algorithm.

Proportional fairness scheduling algorithms are compromise-based scheduling algorithms that attempt to maintain a balance between two competing interests: (i) maximizing a total throughput of the wireless network 110; and (ii) providing wireless devices 102, 102A, 104 with at least a minimal QoS. In an exemplary embodiment, scheduler node 108 (or data schedulers) can achieve low proportional fairness by using weighted fair queuing (WFQ), which assigns scheduling weights (or factors) to data flows (or streams) transmitted to/from wireless devices 102, 102A, 104 based on capacity/delay characteristics and/or a calculated CQI value (e.g., signal-to-noise ratio (SNR), signal-to-interference plus noise ratio (SINR), signal-to-noise plus distortion ratio (SNDR), etc.) or other channel quality metric, etc., reported by wireless devices 102, 102A, 104 at an access node 106, 106A, 106B of the wireless network 110; the access node 106, 106A, 106B can track the CQI value or other channel quality metric using measurement reports from wireless devices 102, 102A, 104, which value/metric can be updated periodically. The scheduler node 108 (or data schedulers), using a low proportional fairness scheduling algorithm, may distribute a greater amount of wireless resources (e.g., the next available physical resource block, wireless spectrum, etc.) to wireless devices 102, 102A, 104 reporting, for example, high CQI values and/or high data transmit rates (i.e., scheduler node 108 may prefer wireless devices 102, 102A, 104 with "good" RF conditions over those wireless devices 102, 102A, 104 with "poor" RF conditions). Alternatively, scheduler node 108 (or data schedulers) can achieve high proportional fairness through equal distribution of wireless resources (e.g., in a round robin fashion that disregards RF conditions of the wireless devices) among wireless devices 102, 102A, 104. The scheduler node 108 (or data schedulers) achieves medium proportional fairness by scheduling (or assigning) wireless resources to wireless devices 102, 102A, 104 using varying degrees of "fairness" to achieve balance between wireless network 110 capacity and throughput to wireless devices 102, 102A, 104 operating at edges of a radio range of the access node 106, 106A, 106B.

Data rate scheduling algorithms are "best effort" scheduling algorithms that schedule (or assign) wireless resources based on a pre-assigned or dynamic scheduling priority of the wireless device 102, 102A, 104; scheduling priority can be assigned by scheduler node 108 (or data schedulers) such that wireless devices 102, 102A, 104 with the least "expensive" data flows (or streams) or reporting highest capacity/ lowest delay characteristics and/or high CQI value(s) or metric(s) are scheduled first for wireless resource grants (i.e., the next available physical resource blocks, spectrum, etc.). Data rate scheduling algorithms typically have low throughput fairness.

Hybrid scheduling algorithms use a combination of scheduling criteria (e.g., high QoS, high CQI or other channel quality metric, guaranteed services, proportional fairness, average wireless network throughput, etc.) for prioritizing wireless devices 102, 102A, 104 for wireless resource grants.

Access nodes 106, 106A, 106B and/or scheduler node 108 (or data schedulers) can comprise a processor and associated circuitry to execute or direct the execution of computer-readable instructions to obtain information. Access nodes 106, 106A, 106B and/or scheduler node 108 (or data schedulers) can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 106, 106A, 106B and/or scheduler node 108 (or data schedulers) can receive instructions and other input at a user interface.

Wireless network 110 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 110 can be capable of carrying data, for example, to support voice, push-to-talk, broadcast video, and data communications by a wireless device, for example, wireless devices 102, 102A, 104. Wireless network protocols can comprise Code Division Multiple Access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 110 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 110 can also comprise additional base stations, controller nodes, telephony switches, internet routers, network gateways, computer systems, communication links, or some other type of communication equipment, and combinations thereof.

Network node 112 can be any network node configured to communicate information and/or control information over system 100. For example, network node 112 can receive and/or transmit information to/from wireless devices 102, 102A, 104 over system 100. While network node 112 is shown in the backhaul of system 100, network node 112 could alternatively be located between access nodes 106, 106A, 106B and wireless network 110. Network node 112 can be a standalone computing device, computing system, or network component, and can be accessible, for example, by a wired or wireless connection, or through an indirect connection such as through a computer network or wireless network. For example, network node 112 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 112 is not limited to any specific technology architecture, such as LTE, and can be used with any network architecture and/or protocol.

Communication links 114, 116, 118, 120, 122 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 114, 116, 118, 120, 122 can be a radio frequency, microwave, infrared, or other similar signal, and can use a suitable communication protocol, for example, GSM, CDMA, WiMAX, LTE, or combinations thereof. Other wireless protocols can also be used. Links 114, 116, 118, 120, 122 can be a direct link or might include various equipment, intermediate components, systems, and networks.

Figure 2:
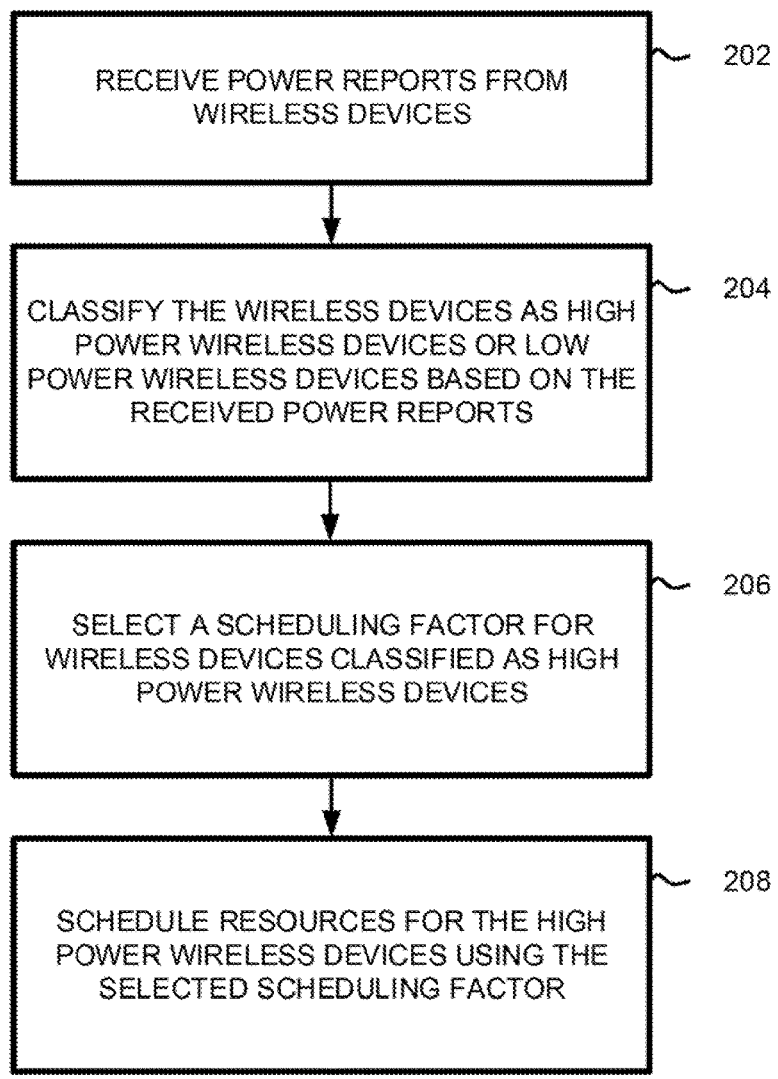
FIG. 2 illustrates an exemplary method for scheduling transmissions from an access node in a wireless network.

FIG. 2 illustrates an exemplary method for scheduling (or assigning) UL/DL transmissions from an access node in a wireless communication network. The method of FIG. 2 will be discussed with reference to the exemplary system 100 illustrated in FIG. 1A and the exemplary power class range(s) of high power wireless devices and off-the-shelf and/or other currently deployed low power wireless devices of the exemplary communication system 100 illustrated in FIG. 1A. But, the exemplary method for scheduling UL/DL transmissions illustrated in FIG. 2 can be implemented with any suitable communication system. In addition, although FIG. 2 depicts steps performed in a particular order or arrangement. One skilled in the art, using the disclosure provided herein, will appreciate that various steps of the method can be omitted, rearranged, combined, and/or adapted in various ways.

Wireless devices 102, 102A, 104 can be configured as high power wireless devices 102, 102A and/or low power wireless devices 104. Wireless devices 102, 102A, 104 can use power headroom (PHR) and/or enhanced PHR (ePHR) message(s) to report a current transmit power state (e.g., an amount of power the wireless device required in a previous subframe structure) at access node 106, 106A, 106B; PHR and/or ePHR reporting at access node 106, 106A, 106B can be periodic and/or event-triggered. Wireless devices 102, 102A, 104 can also report capacity/delay characteristic(s) associated with data flows (or streams) transmitted to/from the wireless device 102, 102A, 104 at access node 106, 106A, 106B.

Scheduler node 108 (or data schedulers) can select (or implement) a proportional fairness scheduling algorithm (e.g., low proportional fairness, medium proportional fairness, and high proportional fairness); scheduler node 108 uses the selected scheduling algorithm to communicate scheduling decisions (e.g., UL/DL scheduling assignments, etc.) between wireless devices 102, 102A, 104 and access node 106, 106A, 106B. For example, scheduler node 108 can collect and store a maximum allowable transmit power (e.g., associated with a defined power class of wireless device 102, 102A, 104) and/or data related to capacity/delay characteristics reported at access node 106, 106A, 106B. Because scheduler node 108 (or data schedulers) often schedule (or assign) wireless resources (i.e., wireless resource grant) among wireless devices 102, 102A, 104 without regard to (or irrespective of) the current transmit power state or power headroom of the wireless device 102, 102A, 104, the access node 106, 106A, 106B via the scheduler node 108 (or data scheduler) may unduly choose (or favor) high power wireless devices 102, 102A reporting a greater transmit power state or power headroom than a similarly situated low power wireless device 104. That is, access node 106, 106A, 106B may unduly favor high power wireless devices 102, 102A with a greater current transmit power state or power headroom for UL resource grant(s) compared to (or over) a low power wireless device 104 reporting (i) a maximum allowable transmit power value that is similar to (or the same as) a maximum allowable transmit power reported at access node 106, 106A, 106B by the high power wireless device 102, 102A; and/or (ii) capacity/delay characteristics that are similar to (or the same as) capacity/delay characteristics reported at access node 106, 106A, 106B by the high power wireless device 102, 102A.

In one embodiment, access node 106, 106A, 106B can classify wireless devices 102, 102A, 104 as high power wireless devices and/or low power wireless devices based on the current transmit power state or power headroom reported by the wireless devices 102, 102A, 104 at access node 106, 106A, 106B using PHR and/or ePHR messaging. Based on the current transmit power state or power headroom of the wireless device 102, 102A, 104, access node 106, 106A, 106B and/or scheduler node 108 can select (or calculate) scheduling weight(s) for data flows (or streams) sent to/from wireless devices 102, 102A, 104 that are classified as high power wireless devices 102, 102A. The access node 106, 106A, 106B via scheduler node 108 can use the selected scheduling weight(s) to distribute wireless resources to wireless devices classified as high power wireless devices 102, 102A.

For example, referring to FIG. 2, at 202, wireless devices 102, 102A, 104 can use periodic and/or event-triggered PHR and/or ePHR messaging to report a current transmit power state or power headroom at access node 106, 106A, 106B. The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\}[\text{dBm}],$$

where $P_{cmax}$ is the maximum allowable transmit power of wireless device 102, 102A, 104, $M_{PUSCH}(i)$ is the number of wireless resources (e.g., the next available physical resource block, wireless spectrum, etc.) allocated to wireless device 102, 102A, 104, $P_{o\_PUSCH}(j)$ is a target received power, $\alpha(j)$ is a pathloss compensation factor, and PL is a calculated pathloss between wireless device 102, 102A, 104 and access node 106, 106A, 106B. $\Delta_{TF}(i)$ and $f(i)$ are parameters used to calculate an offset associated with a transport format and a power control adjustment, respectively.

At 204, access node 106, 106A, 106B can classify wireless devices 102, 102A, 104 as high power wireless devices or low power wireless devices based on current transmit power state or power headroom reported at access node 106, 106A, 106B using PHR and/or ePHR messaging at step 202. For example, access node 106, 106A, 106B can collect and store: (i) a calculated CQI value (e.g., SNR, SINR, SNDR, etc., associated with wireless device 102, 102A, 104); (ii) a maximum allowable transmit power (e.g., associated with a defined power class of the wireless device 102, 102A, 104); and/or (iii) data related to capacity/delay characteristics (e.g., an amount of data buffered per wireless device, an RF signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.), of the wireless device 102, 102A, 104 reported at access node 106, 106A, 106B. If the wireless device 102, 102A reports a greater current transmit power state or power headroom than another wireless device 104 reporting: (i) a same (or similar) CQI value (or CQI value within a predefined range) as wireless device 102, 102A; and/or (ii) a same (or similar) value range for a maximum allowable transmit power level as wireless device 102, 102A, access node 106, 106A, 106B compares data related to capacity/delay characteristics (e.g., RF signal quality, buffer delay/capacity, etc.) reported by wireless devices 102, 102A, 104 at the access node 106, 106A, 106B. If the capacity/delay characteristics reported by wireless devices 102, 102A, 104 are similar, access node 106, 106A, 106B flags (or classifies) wireless devices 102, 102A reporting a greater current transmit power state or power headroom than the other wireless device 104 as a high power wireless device 102, 102A.

At 206, access node 106, 106A, 106B selects (or assigns) a scheduling factor to wireless devices 102, 102A, 104 classified at step 204 as high power wireless devices 102, 102A. For example, based on the current transmit power state or power headroom reported by high power wireless devices 102, 102A at access node 106, 106A, 106B using PHR and/or ePHR messaging, access node 106, 106A, 106B via scheduler 108 (or data scheduler) can calculate (or select from a stored list) scheduling weights (or factors) and assign the calculated (or selected) scheduling weights to data flows (or streams) sent to/from the high power wireless devices 102, 102A.

At 208, the scheduler node 108 (or data scheduler) using, for example, a proportional fairness scheduling algorithm, can distribute (or schedule) wireless resource grants for wireless devices 102, 102A, 104. For example, scheduler node 108 can use the calculated (or selected) scheduling weights to distribute wireless resources equally to high power wireless devices 102, 102A and low power wireless devices 104 reporting a same (or similar) CQI value, a same (or similar) maximum allowable transmit power level, and/or same (or similar) capacity/delay characteristics at access node 106, 106A, 106B.

Figure 3:
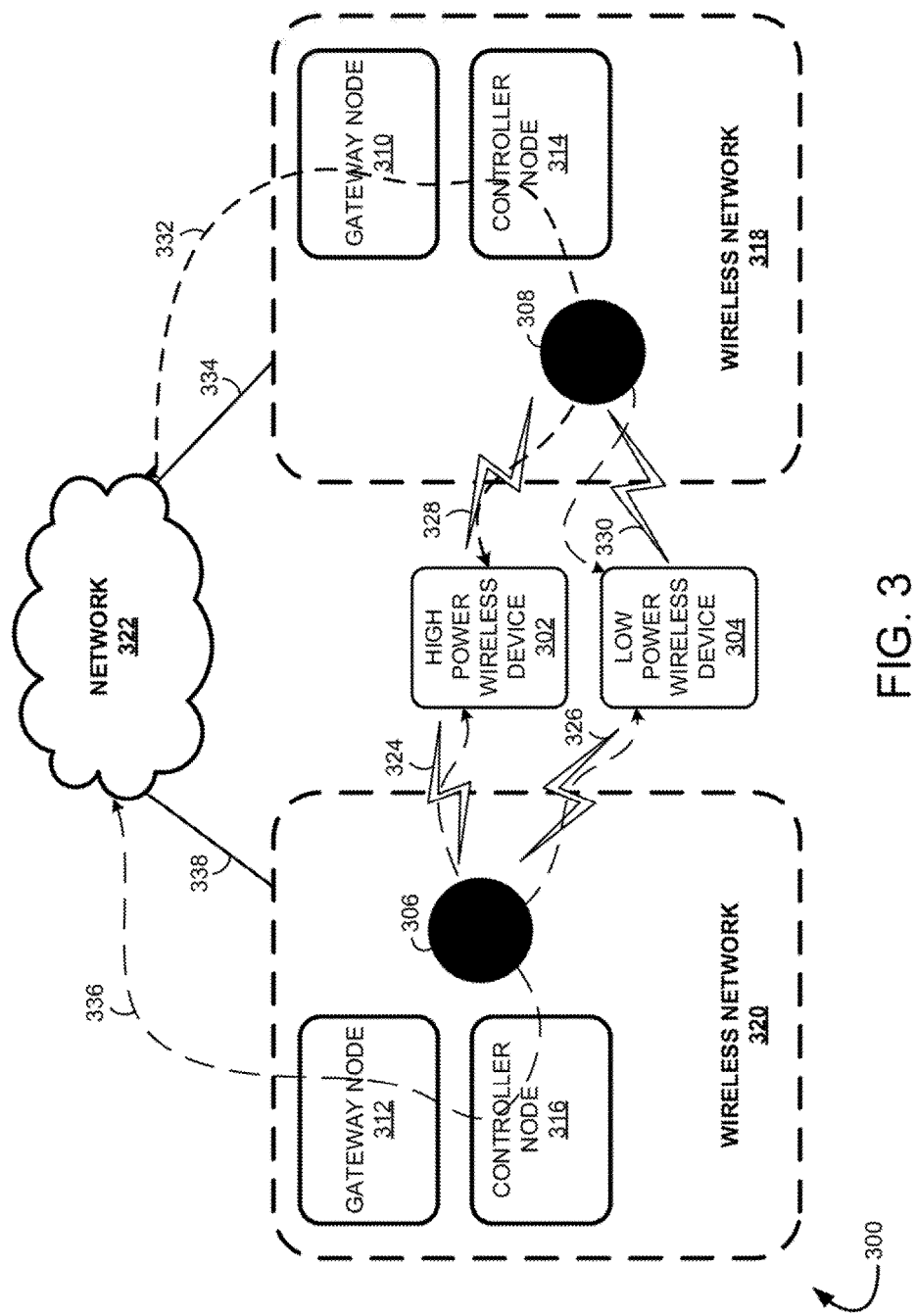
FIG. 3 illustrates another exemplary communication system for scheduling transmissions from an access node in a wireless network.

FIG. 3 illustrates another exemplary communication system 300 for scheduling (or assigning) UL/DL transmissions to/from an access node in a communication network. The system 300 will be discussed with reference to the exemplary power class range(s) of high power wireless devices and off-the-shelf and/or other deployed low power wireless devices illustrated in FIG. 1B and exemplary Table 1. System 300 can comprise high power wireless devices and/or off-the-shelf or other low power wireless devices 302, 304, access nodes 306, 308 (which can include data schedulers), gateway node(s) 310, 312, controller node(s) 314, 316, and wireless networks 318, 320, and network 322. A scheduler node (e.g., scheduler node 108 illustrated in FIG. 1A) can be included in the backhaul of system 300. The communications between high power wireless devices or off-the-shelf and/or other deployed low power wireless devices can be relayed, monitored, inspected, and/or scheduled by an inspection module or node at access nodes 306, 308 and/or a data scheduler or scheduler node.

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between high power wireless devices and/or low power devices 302, 304, access nodes 306, 308, scheduler node 108, etc., and wireless networks 318, 320 and network 322.

As noted above, wireless devices 302, 304 can be configured as different power class wireless devices (e.g., high power wireless devices and/or low power wireless devices) and can be any device configured to communicate over system 300 using a wireless communication link or interface. In one embodiment, illustrated in Table 1, the maximum allowable transmit power for wireless devices 302, 304 can be defined by the power class of the wireless device. For example, the maximum allowable transmit power level and tolerance (i.e., power error limits) with which wireless device 302, 304 can transmit data on a given operating band (e.g., Bands I-III) can be specified based on a pre-defined power class (e.g., power classes 1-4 illustrated in Table 1 and/or FIG. 1B) of the wireless device 302, 304 rather than a physical maximum transmit capability of the wireless device 302, 304 hardware. Off-the-shelf and/or other low power wireless devices are currently defined as power class 3 and/or power class 4 wireless devices with a maximum allowable transmit power level of +23 dBm for network operating Bands I-III; high power class wireless devices are currently defined as power class 1 or power class 2 wireless devices with a maximum allowable transmit power level of +26 dBm for network operating Bands I-III, as illustrated in Table 1.

Wireless devices 302, 304 (e.g., configured as either high power wireless devices or low power wireless devices) can include a cell phone, a smart phone, a computing platform such as a laptop, a palmtop, or a tablet, a PDA, an internet access device, and combinations thereof. A wireless interface of wireless devices 302, 304 can include one or more transceivers for transmitting and receiving data over system 300. Each transceiver can be associated with the same or different frequency bands, the same or different radio access technologies, the same or different network providers (e.g., wireless networks 318, 320), and/or the same or different services. For example, wireless devices 302, 304 can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302, 304 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302, 304 can be connected with access nodes 306, 308 through communication links 324, 326, 328, 330. Links 324, 326, 328, 330 can use various communication media, such as air, space, metal, optical fiber, or some other signal propagation path—including combinations thereof. Links 324, 326, 328, 330 may comprise many different signals sharing the same link. Links 324, 326, 328, 330 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304 and access nodes 306, 308 could share the same representative wireless link, but be transferred over different communication sessions, frequencies, timeslots, packets, ports, sockets, logical transport links, or in different directions—including combinations thereof.

Access nodes 306, 308 can include data scheduler(s) and can be any network node configured to provide communication between wireless devices 302, 304 and wireless networks 318, 320 and/or network 322. Access nodes 306, 308 can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 306, 308 can use data scheduler(s) and/or coordinate with a scheduler node (e.g., scheduler node 108 as illustrated with reference to FIG. 1A) to communicate scheduling decisions (e.g., UL/DL scheduling assignments) to wireless devices 302, 304 using control information carried by an U L/DL control channel 332, 336. In one embodiment, the scheduling assignments can include PUSCH resource indication(s), a transport format (e.g., an index of MCS, which may be QPSK, QAM16, QAM64, etc.), hybrid-ARQ information, control information (e.g., related to multiplexing), command for power control of the PUCCH, etc.

Access nodes 306, 308 can comprise a processor and associated circuitry to execute or direct the execution of computer-readable instructions to obtain information. Access nodes 306, 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 306, 308 can receive instructions and other input at a user interface.

Gateway node(s) 310, 312 can be any network node configured to interface with other network nodes using various protocols. Gateway nodes 310, 312 can communicate user data over system 300. Gateway nodes 310, 312 can be standalone computing devices, computing systems, or network components, and can be accessible, for example, by a wired or wireless connection, or through an indirect connection such as through a computer network or communication network. For example, gateway nodes 310, 312 can include a Serving Gateway (SGW) and/or a Packet Data Network Gateway (PGW), etc. One of ordinary skill in the art would recognize that gateway nodes 310, 312 are not limited to any specific technology architecture, such as LTE, and can be used with any network architecture and/or protocol. Moreover, while two gateway nodes 310, 312 are illustrated in FIG. 3 as being in communication with network 322 and wireless networks 318, 320, one of ordinary skill in the art would recognize that a single gateway node could be in communication with network 322 and wireless networks 318, 320.

Gateway nodes 310, 312 can comprise a processor and associated circuitry to execute or direct the execution of computer-readable instructions to obtain information. Gateway nodes 310, 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 310, 312 can receive instructions and other input at a user interface.

Controller node(s) 314, 316 can be any network node configured to communicate information and/or control information over system 400. Controller nodes 314, 316 can be configured to transmit control information associated with a handover procedure. Controller nodes 314, 316 can be a standalone computing device, computing system, or network component, and can be accessible, for example, by a wired or wireless connection, or through an indirect connection such as through a computer network or communication network. For example, controller nodes 314, 316 can include a MME, a HSS, a PCRF, an AAA node, a RMS, a SPS, a policy server, etc. One of ordinary skill in the art would recognize that controller nodes 314, 316 are not limited to any specific technology architecture, such as LTE and can be used with any network architecture and/or protocol. Moreover, while two controller nodes 314, 316 are illustrated in FIG. 3 as being in communication with network 322 and wireless networks 318, 320, one of ordinary skill in the art would recognize that a single controller node could be in communication with network 322 and wireless networks 318, 320.

Controller nodes 314, 316 can comprise a processor and associated circuitry to execute or direct the execution of computer-readable instructions to obtain information. Controller nodes 314, 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller nodes 314, 316 can receive instructions and other input at a user interface.

Although not shown for ease of illustration, access node 306 can be in communication with gateway node 312 and with controller node 316 through communication links. Gateway node 312 can be in communication with controller node 316, network 322, and/or wireless network 318 through communication links. Access node 308 can be in communication with gateway node 310 and with controller node 314 through communication links. Gateway node 310 can be in communication with controller node 314, network 322, and/or wireless network 320 through communication links. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless (or communication) networks 318, 320 and/or network 322 can be wired and/or wireless communication networks, and can comprise processing nodes, routers, gateways, and physical and/or wireless data links for carrying data among various network elements, including combinations thereof, and can include a LAN or WAN, and an internetwork (including the internet). Wireless networks 318, 320 and/or network 322 can be capable of carrying data, for example, to support voice, PTT, broadcast video, and data communications by a wireless device such as wireless devices 302, 304. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless networks 318, 320 and/or network 322 comprise Ethernet, Fast Ethernet, Gigabit Ethernet, Local Talk (such as Carrier Sense Multiple Access with Collision Avoidance), Token Ring, FDDI, ATM. Wireless networks 318, 320 and/or network 322 can also comprise additional base stations, controller nodes, telephony switches, internet routers, network gateways, computer systems, communication links, or some other type of communication equipment, and combinations thereof.

Wireless (or communication) networks 318, 320 and/or network 322 can establish a communication session with wireless devices 302, 304, access nodes 306, 308, and/or each other. In one embodiment, wireless network 318 may be a home (e.g., a primary, preferred, or high priority) network to wireless devices 302, 304. Wireless network 320 may be a roaming (e.g., non-preferred or low priority) network to wireless devices 302, 304. Wireless devices 302, 304 may switch between communicating with home network 318 and roaming network 320. Wireless devices 302, 304 may also communicate with network 322.

Wireless networks 318, 320 and/or network 322 use data scheduler(s) (not shown) and/or scheduler node(s) 108 (illustrated in FIG. 1A) to schedule (or assign) UL/DL wireless resources (i.e., wireless resource grant) among connected wireless devices without regard to (or irrespective of) the power class of the wireless device. Typically, the power class of the wireless device does not unduly influence wireless resource grants to the connected wireless devices. But, when high power wireless devices and off-the-shelf and/or other deployed low priority wireless devices, operating within a radio range (i.e., minimum usable signal area) of an access node, report similar maximum allowable transmit power(s) and/or capacity/delay characteristics at the access node, scheduler(s) of the access node may unduly choose the high power wireless devices for UL resource grant(s) compared to (or over) off-the-shelf and/or other deployed low power wireless devices because of disparities in power headroom data reported at the access node by the wireless devices. In one embodiment, to address power headroom disparities between high power wireless devices and off-the-shelf and/or other deployed low power wireless devices, the access node may calculate an offset for wireless devices whose reported power headroom data meets a criteria. Using the calculated offset, the access node and/or scheduler(s) can select a weighting (or scheduling factor) used to: (i) de-prioritize high power roaming wireless devices or other low power wireless devices; and (ii) normalize disparities in power headroom reported by high power wireless devices and low power wireless devices that have an established communication session with a home network. The scheduler(s) may use the selected weightings to distribute wireless resources among connected wireless devices.

Figure 4:
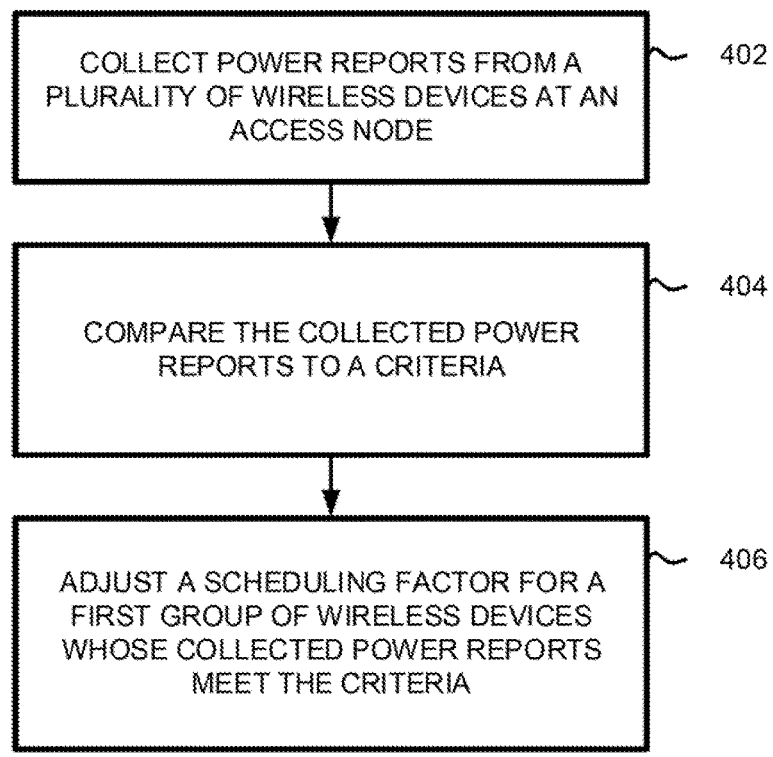
FIG. 4 illustrates another exemplary method for scheduling transmissions from an access node.

FIG. 4 illustrates another exemplary method for scheduling (or assigning) UL/DL transmissions from an access node in a wireless communication network. The method of FIG. 4 will be discussed with reference to the exemplary system 300 illustrated in FIG. 3 and the exemplary power class range(s) of high power wireless devices and off-the-shelf and/or other currently deployed low power wireless devices illustrated in FIG. 1A. But, the exemplary method for scheduling UL/DL transmissions illustrated in FIG. 4 can be implemented with any suitable communication system. In addition, although FIG. 4 depicts steps performed in a particular order or arrangement. One skilled in the art, using the disclosure provided herein, will appreciate that various steps of the method can be omitted, rearranged, combined, and/or adapted in various ways.

Wireless devices 302, 304 can be configured as high power wireless devices or low power wireless devices. Wireless devices 302, 304 can use PHR and/or ePHR messages to report a current transmit power state or power headroom at access node 306, 308; PHR and/or ePHR reporting at access node 306, 308 can be periodic and/or event-triggered. Wireless devices 302, 304 can also report capacity/delay characteristic(s) or other channel quality metric(s) associated with data flows (or streams) transmitted to/from the wireless device 302, 304 at access node 306, 308.

In one embodiment, access node 306, 308 can classify wireless devices 302, 304 as high power wireless devices and/or low power wireless devices based on the current transmit power state or power headroom reported by the wireless devices 302, 304 at access node 306, 308. For wireless devices classified as high power wireless devices 302, access node 306, 308 can identify (or detect) a roaming status of the wireless device 302. Based on the roaming status of the wireless device 302 (and using the current transmit power state or power headroom reported by the wireless device), access node 306, 308 via scheduler node 108 (illustrated in FIG. 1A) can select (or calculate) scheduling weight(s) for data flows (or streams) sent to/from wireless devices classified as high power wireless devices 302 that include a roaming wireless device status. The access node 306, 308 via scheduler node 108 can use the selected scheduling weight(s) to de-prioritize high power roaming wireless devices 302 for wireless resource grants compared to (or over) high power wireless devices and/or low power wireless devices that have an established communication session with a home network 318.

For example, referring to FIG. 4, at 402, wireless devices 302, 304 can use periodic and/or event-triggered PHR and/or ePHR messaging to report a current transmit power state or power headroom at access node 306, 308. The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\}[\text{dBm}],$$

where $P_{cmax}$ is the maximum allowable transmit power of wireless device 302, 304, $M_{PUSCH}(i)$ is the number of wireless resources (e.g., the next available physical resource block, wireless spectrum, etc.) allocated to wireless device 302, 304, $P_{o\_PUSCH}(j)$ is a target received power, $\alpha(j)$ is a pathloss compensation factor, and PL is a calculated pathloss between wireless device 302, 304 and access node 306, 308.

$\Delta_{TF}(i)$ and f(i) are parameters used to calculate an offset associated with a transport format and a power control adjustment, respectively.

At 404, access node 306, 308 can classify wireless devices 302, 304 as high power wireless devices or low power wireless devices based on current transmit power state or power headroom reported at access node 306, 308 using PHR and/or ePHR messaging at step 402. For example, access node 306, 308 can collect and store: (i) a calculated CQI value (e.g., SNR, SINR, SNDR, etc., associated with wireless device 302, 304); (ii) a maximum allowable transmit power (e.g., associated with a defined power class of the wireless device 302, 304); and/or (iii) data related to capacity/delay characteristics (e.g., an amount of data buffered per wireless device, an RF signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.), of the wireless device 302, 304 reported at access node 306, 308. If the wireless device 302 reports a greater current transmit power state or power headroom than another wireless device 304 reporting: (i) a same (or similar) CQI value (or CQI value within a predefined range) as wireless device 302; and/or (ii) a same (or similar) value range for a maximum allowable transmit power level as wireless device 302, access node 306, 308 compares data related to capacity/delay characteristics (e.g., RF signal quality, buffer delay/capacity, etc.) reported by wireless devices 302, 304 at the access node 106, 106A, 106B. If the capacity/delay characteristics reported by wireless devices 302, 304 are similar, access node 306, 308 flags (or classifies) wireless devices 302 reporting a greater current transmit power state or power headroom than the other wireless device 304 as a high power wireless device 302. An access node 308 of the home wireless network 318 can determine a roaming status of wireless devices (or groups of wireless devices) classified as high power wireless devices. For example, high power wireless device(s) 302 can be assigned a roaming wireless device status at access node 308. In another embodiment, access node 308 of home wireless network 318 can assign (or determine) that high power wireless device(s) 302 has an established communication session with a home wireless network 318 (i.e., wireless device 302 is not a roaming wireless device). Access node 308 (e.g., using a data scheduler or scheduler node 108) can calculate (or select from a stored list) scheduling weights (or factors) for the high power roaming wireless device(s) 302 and/or the high power home wireless device(s) 302.

At 406, the access node 308 of home wireless network 318 via scheduler node 108 can use the calculated scheduling weights (or factors) to (i) de-prioritize high power roaming wireless devices 302 for wireless resource grants compared to (or over) high power home wireless devices and/or low power wireless devices that have an established communication session with a home wireless network 318; and/or (ii) use the calculated scheduling weights (or factors) to distribute wireless resources equally to high power home wireless devices 302 and low power home wireless devices 304 reporting a same (or similar) CQI value, a same (or similar) maximum allowable transmit power level, and/or same (or similar) capacity/delay characteristics at home access node 308.

Figure 5:
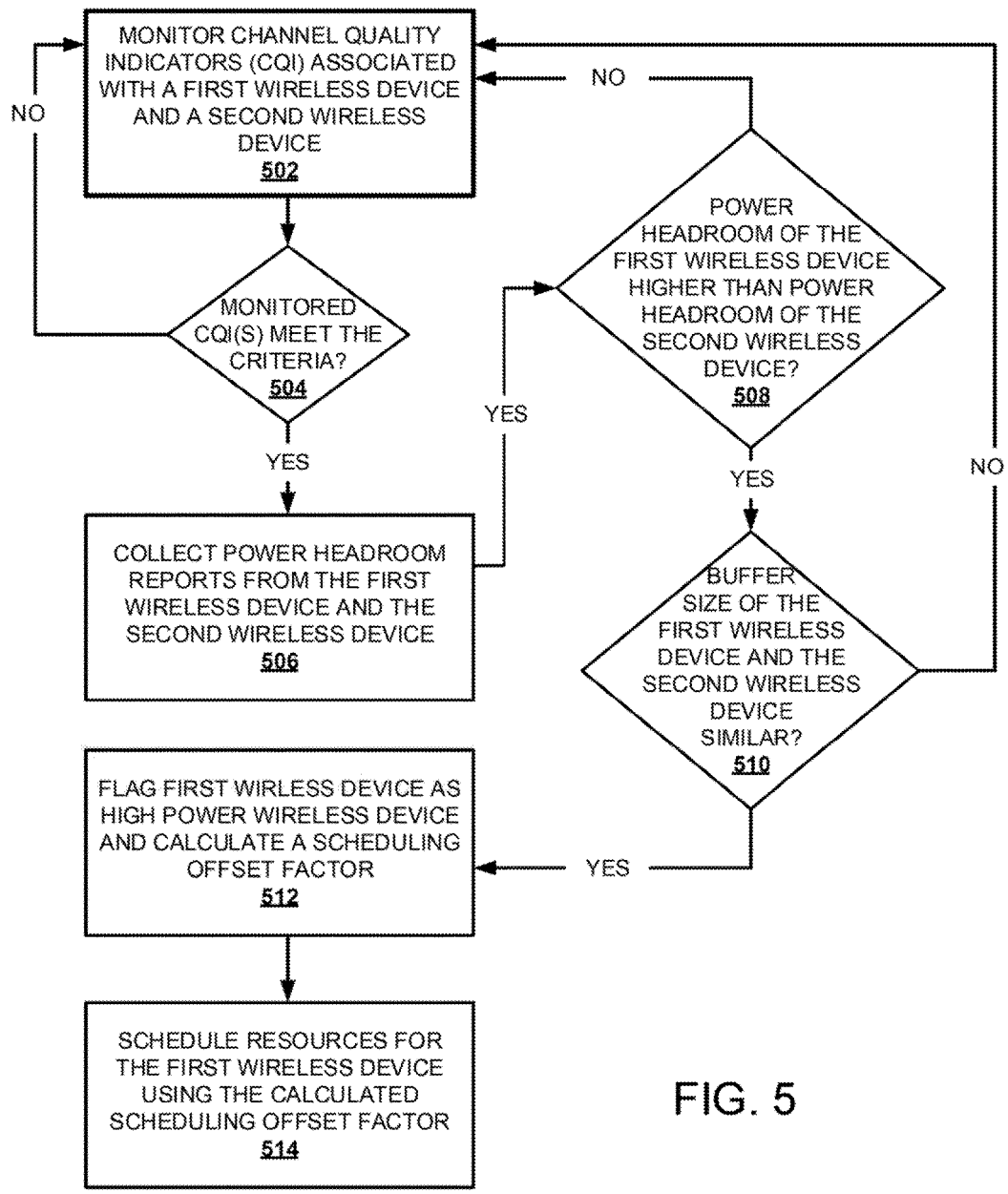
FIG. 5 illustrates a flow chart of an exemplary method for scheduling transmissions from an access node.

FIG. 5 illustrates an exemplary flow chart of an exemplary method for scheduling (or assigning) UL/DL transmissions from an access node in a wireless communication network. The method of FIG. 5 will be discussed with reference to the exemplary system 300 illustrated in FIG. 3 and the exemplary power class range(s) of high power wireless devices and off-the-shelf and/or other currently deployed low power wireless devices illustrated in FIG. 1A. But, the exemplary method for scheduling UL/DL transmissions illustrated in FIG. 5 can be implemented with any suitable communication system. In addition, although FIG. 5 depicts steps performed in a particular order or arrangement. One skilled in the art, using the disclosure provided herein, will appreciate that various steps of the method can be omitted, rearranged, combined, and/or adapted in various ways.

Referring to FIG. 5, at 502, access node 306, 308 can monitor CQI values (e.g., SNR, SINR, SNDR, etc.) or other channel quality metric, etc., reported by wireless devices 302, 304 at access node 306, 308 of network 322, the access node 306, 308 can track the CQI value or other channel quality metric using measurement reports from the wireless devices 302, 304, which value/metric can be periodically updated. At 504, the access node 306, 308 may compare the monitored CQI values or other channel quality metric reported by wireless devices 302, 304 to a criteria (e.g., a monitored CQI value or other channel quality metric within a pre-defined range stored at a processing node, a same (or similar) CQI value or other channel quality metric reported by wireless device 302 and wireless device 304, etc.). If, at 504, the monitored CQI value(s) or other channel quality metric(s) reported by wireless devices 302, 304 do not meet the criteria "NO," then access node 306, 308 continues to track the CQI value or other channel quality metric using measurement reports from the wireless devices 302, 304. If, at 504, the monitored CQI value(s) or other channel quality metric(s) reported by wireless devices 302, 304 meets the criteria "YES," then at 506 access node 306, 308 can instruct wireless devices 302, 304 to use periodic and/or event-triggered PHR and/or ePHR messaging to report a current transmit power state or power headroom at access node 306, 308.

The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\} [\text{dBm}],$$

where $P_{cmax}$ is the maximum allowable transmit power of wireless device 302, 304, $M_{PUSCH}(i)$ is the number of wireless resources (e.g., the next available physical resource block, wireless spectrum, etc.) allocated to wireless device 302, 304, $P_{o\_PUSCH}(j)$ is a target received power, $\alpha(j)$ is a pathloss compensation factor, and PL is a calculated pathloss between wireless device 302, 304 and access node 306, 308. $\Delta_{TF}(i)$ and f(L) are parameters used to calculate an offset associated with a transport format and a power control adjustment, respectively.

At 508, access node 306, 308 determines if current transmit power state or power headroom reported by at least one wireless devices 302 at access node 306, 308 is greater than the current transmit power state or power headroom reported by at least one other wireless device 304. If, at 508, current transmit power state or power headroom reported by wireless device 302 is less than or equal to a current transmit power state or power headroom reported by wireless device 304 "NO," then access node 306, 308 repeats (or reverts back to) step 502. If, at 508, current transmit power state or power headroom reported by wireless device 302 is greater than a current transmit power state or power headroom reported by wireless device 304 "YES," then access node 306, 308 collects capacity/delay characteristics (e.g., RF signal quality, buffer delay/capacity, etc.) of the wireless devices 302, 304 at access node 306, 308 at 510.

If, at 510, the wireless devices 302, 304 report: (i) a same (or similar) CQI value (step 504); and (ii) same (or similar) capacity/delay characteristics (step 510), but the current transmit power state or power headroom reported by wireless device 302 is less than or equal to a current transmit power state or power headroom reported by wireless device 304 (step 508) "NO," then then access node 306, 308 repeats (or reverts back to) step 502. If, at 510, the wireless devices 302, 304 report: (i) a same (or similar) CQI value (step 504); (ii) a current transmit power state or power headroom of wireless device 302 that is greater than a current transmit power state or power headroom reported by wireless device 304 (step 508); and, (iii) same (or similar) capacity/delay characteristics (step 510) "YES," then at 512 access node 306, 308 flags (or classifies) wireless device 302 as a high power wireless device.

Access node 308 can determine a roaming status of high power wireless device 302. If, at 512, access node 308 determines that high power wireless device 302 is a roaming wireless device, then at 512 access node 308 (e.g., using a data scheduler or scheduler node 108) can calculate (or select from a stored list) scheduling weights (or factors) for the high power roaming wireless device 302. If, at 512, access node 308 determines that high power wireless device 302 has an established communication session with a home wireless network 318 (i.e., wireless device 302 is not a roaming wireless device), then at 512 access node 308 can calculate (or select from a stored list) scheduling weights (or factors) for the high power home wireless device 302.

At 514, access node 308 can use the calculated scheduling weights to (i) de-prioritize high power roaming wireless device 302 for wireless resource grants compared to (or over) high power home wireless devices and/or low power home wireless devices 304; and/or (ii) use the calculated scheduling weights to distribute wireless resources equally to high power home wireless devices 302 and low power home wireless devices 304 reporting a same (or similar) CQI value or other channel quality metric and/or same (or similar) capacity/delay characteristics at home access node 308.

One skilled in the art, using the disclosure provided herein, will appreciate that various steps of the methods can be omitted, rearranged, combined and/or adapted in various ways and can be completed by multiple wireless devices and access nodes.

Figure 6:
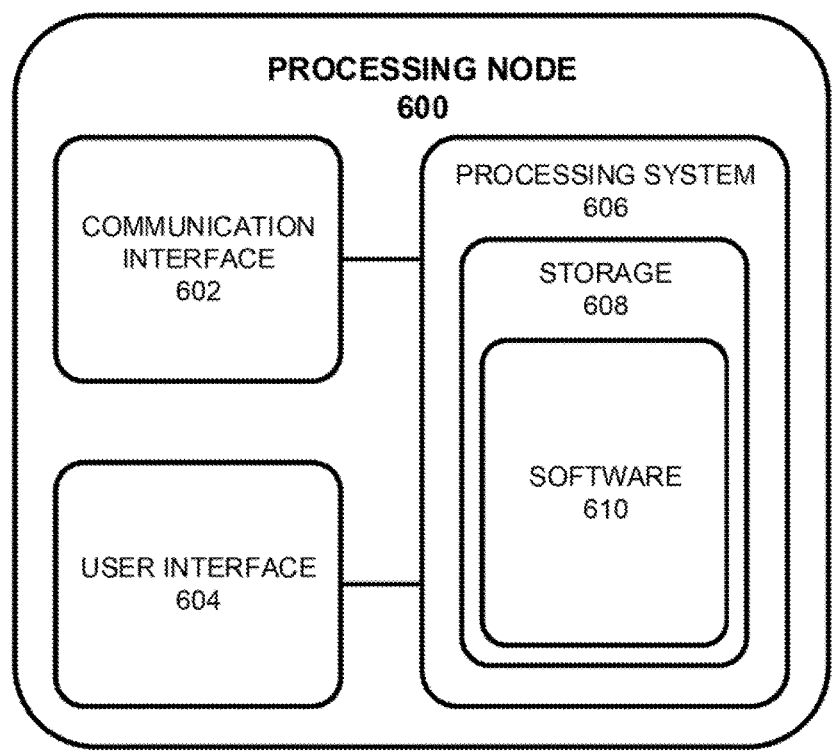
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 106, 106A, 106B, scheduler node 108, network node 112, gateway nodes 310, 312, and controller nodes 314, 316. Processing node 600 can also be an adjunct or component of a network element, such as an element of access nodes 106, 106A, 106B, scheduler node 108, network node 112, gateway nodes 310, 312, and controller nodes 314, 316. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for allocating resources from an access node, the method comprising:
    receiving, at the access node, power reports from multiple wireless devices;
    classifying, at the access node, each wireless device of the multiple wireless devices as either a high power wireless device or a low power wireless device based on the received power reports;

selecting, at the access node, an offset scheduling factor for wireless devices classified as high power wireless devices, the offset scheduling factor based on a weighted fair queuing (WFQ) value and a current transmit power state of the wireless device; and allocating, at the access node, resources for the high power wireless device using the selected offset scheduling factor.

2. The method of claim 1, wherein the power reports include a current transmit power state or a power headroom of the wireless device.

3. The method of claim 2, wherein the power reports are power headroom reports (PHR) or enhanced PHR (ePHR).

4. The method of claim 1, wherein the power reports are periodic, event-triggered, or both.

5. A system for scheduling transmissions from an access node, the system comprising:

a processing node configured to:
collect, at the access node, power reports associated with a plurality of wireless devices;
compare the collected power reports to a criteria; and
select a scheduling factor for a first group of wireless devices of the plurality of wireless devices whose collected power reports meet the criteria, the scheduling factor based on a weighted fair queuing (WFQ) value and a current transmit power state of the wireless device.

6. The system of claim 5, wherein the collected power reports include a current transmit power state or a power headroom of the wireless device.

7. The system of claim 6, wherein the collected power reports are power headroom reports (PHR) or enhanced PHR (ePHR).

8. The system of claim 5, wherein the collected power reports are periodic, event-triggered, or both.

9. The system of claim 5, wherein the first group of wireless devices report a power transmit state that is greater than a power transmit state of a second group of wireless devices of the plurality of wireless devices.

10. The system of claim 5, wherein the first group of wireless devices are high power wireless devices and a second group of wireless devices of the plurality of wireless devices are low power wireless devices.

11. The system of claim 10, wherein the first group of wireless devices are roaming wireless devices.

12. The system of claim 11, wherein the selected scheduling factor is used to de-prioritize the first group of wireless devices for allocation of wireless resources.

13. The system of claim 5, wherein the criteria is a value range for power headroom reported by the plurality of wireless devices.

14. A method for scheduling transmissions from an access node, the method comprising:

calculating, at the access node, a scheduling offset factor for a first wireless device, the scheduling offset factor being calculated if:
a power headroom reported at the access node by the first wireless device is greater than a power headroom reported by a second wireless device; and
a buffer size of the first wireless device and a buffer size of the second wireless device is within a predefined range of buffer sizes; and scheduling resources for the first wireless device using the calculated scheduling offset factor.

15. The method of claim 14, wherein the first wireless device is a high power wireless device and the second wireless device is a low power wireless device.

* * * * *